United States Patent [19]

Wille

[11] Patent Number: 5,220,872
[45] Date of Patent: Jun. 22, 1993

[54] APPARATUS FOR SEPARATING CONTAMINATED MATERIAL FROM IMPURITIES CONTAINED THEREIN

[76] Inventor: Heinz Wille, Kilianstrasse 47, DE-8500 Nürnberg, Fed. Rep. of Germany

[21] Appl. No.: 874,632

[22] Filed: Apr. 27, 1992

[30] Foreign Application Priority Data

Sep. 28, 1991 [EP] European Pat. Off. ......... 91116611.4

[51] Int. Cl.$^5$ ................................................. B09B 3/00
[52] U.S. Cl. ...................................... 110/236; 432/172
[58] Field of Search ...................... 110/235, 236, 346; 432/159, 172

[56] References Cited

U.S. PATENT DOCUMENTS

| | | | |
|---|---|---|---|
| 4,784,603 | 11/1988 | Robak, Jr. et al. | 110/236 X |
| 4,970,969 | 11/1990 | Koptis et al. | 110/236 X |
| 5,072,674 | 12/1991 | Noland et al. | 110/236 X |

FOREIGN PATENT DOCUMENTS 3612892 7/1990 Fed. Rep. of Germany .

*Primary Examiner*—Edward G. Favors
*Attorney, Agent, or Firm*—Hoffmann & Baron

[57] ABSTRACT

Described is an apparatus for separating contaminated material from impurities contained therein, by heating by means of hot gases. The apparatus has receiving chambers for accommodating the contaimated materials, and heating chambers which surround the respective receiving chambers. Each heating chamber is divided into first and second chamber means of which one is designed to carry a flow of burner gas while the second is designed to carry a flow of coolant. The first and second chamber means extend in mutually separate relationship and in a helical configuration around the associated receiving chamber. Each receiving chamber has gas distributor members to produce a turbulent flow in the chamber.

15 Claims, 7 Drawing Sheets

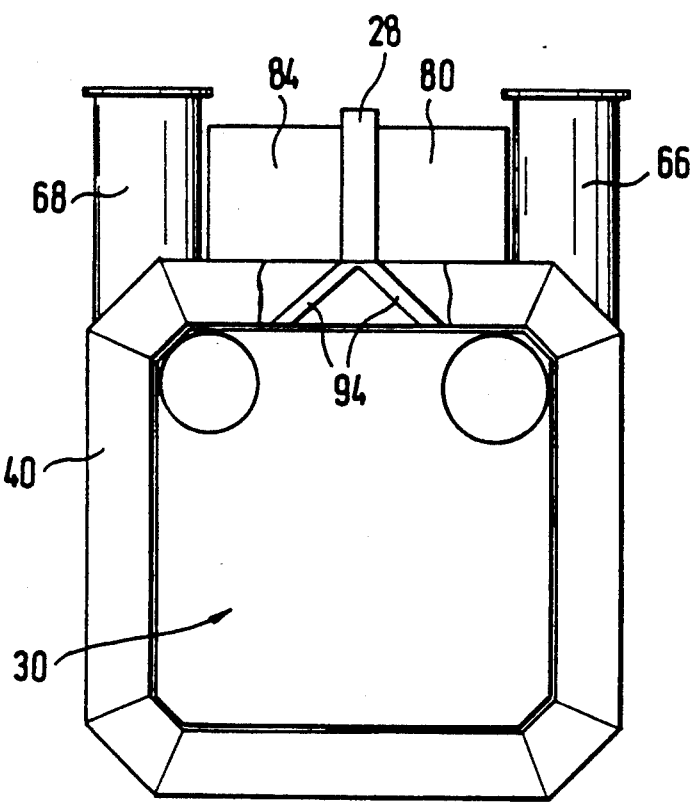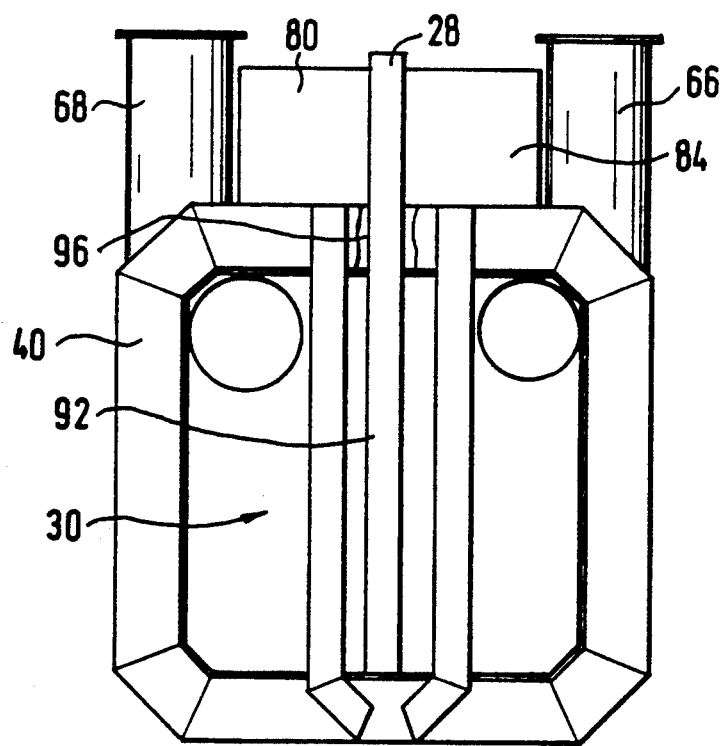

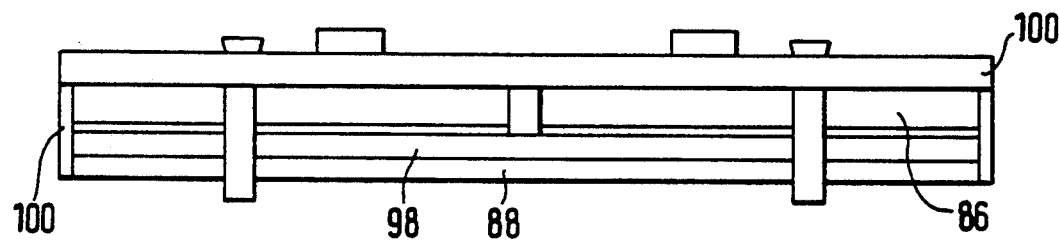
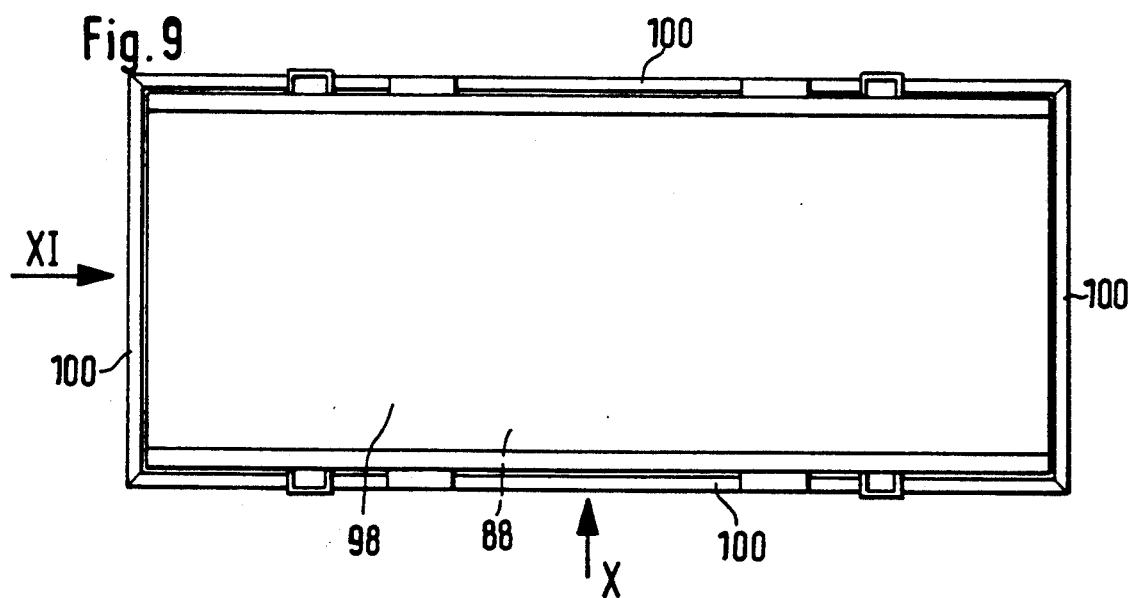
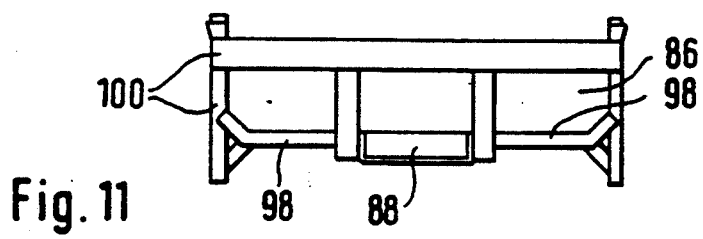

APPARATUS FOR SEPARATING CONTAMINATED MATERIAL FROM IMPURITIES CONTAINED THEREIN

BACKGROUND OF THE INVENTION

The invention relates to an apparatus for separating materials bearing impurities, from the impurities.

In this specification the contaminated materials which are to be purified by separation from the impurities include for example and more especially metals but also other materials such as mineral materials, ceramic materials, cellulose and the like.

One form of apparatus for the separation of impurity-bearing metal from the impurities, as is to be found in DE 36 12 892 C2, involves heating the material to be purified by means of hot waste gases produced by a burner. The apparatus thus comprises a combustion chamber with the burner, wherein the combustion chamber is connected by conduits to respective ones of first and second receiving chambers which are spatially separated from the combustion chamber and which are provided for receiving the contaminated metals. The receiving chambers can be air-tightly closed off relative to the ambient atmosphere by means of a door. The receiving chambers are each connected to the burner by way of a return conduit, and each receiving chamber is also surrounded by a heating chamber connected to a second conduit which branches off the first conduit which provides the connection between the burner combustion chamber and the respective receiving chamber. The conduit connecting the burner combustion chamber to the receiving chamber, and the second conduit which branches off that conduit, each have a control device operatively associated therewith, while the apparatus further comprises a second return conduit between the respective heating chamber and the associated control device. A by-pass conduit is provided between the respective control device and the common burner combustion chamber.

SUMMARY OF THE INVENTION

An object of the present invention is to improve an apparatus for separating contaminated material from impurity contained therein, which provides for optimisation of the purification effect.

Another object of the present invention is that of providing an apparatus for separating material bearing impurities, from the impurities, by a heating effect using hot gases, which can operate on a fast functional cycle and which also affords flexibility in terms of its operating procedure, thereby to optimise the purification effect and minimise energy expenditure.

Still another object of the present invention is to provide an apparatus for separating impurity-bearing metal from its impurities which is operable in such a way as to provide for rapid heating of the contaminated material, to optimise operation of the apparatus.

Yet a further object of the present invention is to provide an apparatus for separating contaminated material from impurities contained therein, which affords an enhanced level of efficiency in terms of the purification effect produced thereby while being of a simple and rational design configuration.

In accordance with the present invention the foregoing and other objects are achieved by an apparatus for separating material bearing impurities, from its impurities, by heating by means of hot combustion or exhaust gases produced by a burner, comprising a combustion chamber having said burner and connected by a first conduit means to respective ones of first and second receiving chambers which are spatially separated from the combustion chamber and which are provided for receiving the contaminated material. The receiving chambers are adapted to be air-tightly closed off relative to ambient atmosphere by means of a door and are each connected to the burner combustion chamber by way of a first return conduit means. A heating chamber surrounds each receiving chamber and is connected to a second conduit means which branches off said first conduit means, while respective control means are associated with each of the corresponding first and second conduit means. A respective second return conduit means extends between each heating chamber and the associated control means, while a respective by-pass conduit means extends between the corresponding control means and the combustion chamber. Each heating chamber is divided into first and second chamber means of which the first is designed to pass therethrough the burner combustion gas, having a combustion gas inlet for fluid communication with the associated second conduit means and a combustion gas outlet for fluid communication with the associated second return conduit means. The second chamber means is designed for cooling purposes with a coolant inlet and a coolant outlet. The two chamber means of each heating chamber surround the associated receiving chamber with winding chamber portions disposed in a helical configuration, which winding chamber portions of the first and second chamber means being arranged in interengaged relationship in succession in the longitudinal direction of the heating chamber and receiving chamber respectively.

The coolant which flows through the second chamber means is preferably cooling air. Due to the fact that each heating chamber is constructed with two mutually separate chamber means, not only is it possible to effect cooling of the associated receiving chamber, after termination of a material purification cycle therein, within a comparatively short period of time so that the apparatus according to the invention has a short dead or non-operational time in that respect, but it is also advantageously possible to adjust the temperature of the combustion gas in the first chamber means of the respective heating chambers, in the desired manner, by suitable control of the flow of coolant through the second chamber means of the corresponding heating chamber. That makes it possible to optimise the purification effect produced by the apparatus and thus minimise the energy consumption for operation of the apparatus.

In a preferred feature of the above-defined configuration in accordance with the invention, the winding chamber portions of the gas chamber means through which the burner gas flows are in fluid communication in series with each other in a helical configuration, wherein the two end portions which are remote from each other of said gas chamber means are provided with said gas inlet and said gas outlet respectively. For the same purpose, it may preferably be provided that each winding chamber portion of the coolant chamber means which is provided for a through flow of coolant is in fluid communication by means of its one end portion with a first collecting duct or manifold and by means of its second end portion with a second collecting duct or manifold, in such a way that the coolant winding chamber portions are connected in fluid flow parallel relationship between the two collecting ducts or manifolds. The two collecting ducts or manifolds for the coolant in that arrangement preferably extend in parallel side-by-side relationship, over the respectively associated heating chamber.

In accordance with a preferred feature of the invention, to provide for reliable minimisation of the cooling times and consequently minimisation of the dead or inoperable time of the apparatus, the combustion gas inlet with said second conduit means and the combustion gas outlet with said second return conduit means and the coolant inlet and outlet are so disposed that in the winding chamber portions of the combustion gas chamber means there is a helical combustion gas flow which is directed in the axial and the peripheral direction of the respectively associated heating chamber in opposite relationship to the flow of the coolant in the winding chamber portions of the coolant chamber means. Such a design configuration therefore provides that there is a helical counter-flow in respect of the coolant relative to the gas which is produced in the combustion chamber and which flows through the combustion gas chamber means; that provides for rapid setting of a desired combustion gas temperature in order to ensure optimum operation of the apparatus, while permitting rapid cooling of the apparatus after the termination of a metal purification procedure.

In accordance with a further aspect of the invention, the foregoing and other objects of the invention may also be attained by an apparatus for separating material such as metal bearing impurities, from said impurities, by heating by means of hot combustion gas produced by a burner, comprising a combustion chamber which contains the burner and which is connected by first conduit means to respective ones of first and second receiving chambers which are spatially separated from the combustion chamber and which are provided for receiving the contaminated material and which can be air-tightly closed off relative to ambient atmosphere by means of a door, being connected to the burner by way of first return conduit means. Each receiving chamber is surrounded by a heating chamber connected to a second conduit means which branches off the first conduit means, with a respective control means associated with each of the first and second conduit means. A respective second return conduit means extends between the respective heating chamber and the associated control means while a respective by-pass conduit means extends between the control means and the common combustion chamber. Each receiving chamber is provided with combustion gas distributor means which are in or are adapted to be in fluid communication with said first conduit means. The combustion gas distributor means are provided at the inside of said door and at the inside, which is towards said door, of the rear wall of the corresponding receiving chamber, in such a way that mutually oppositely directed combustion gas flow configurations occur in the corresponding receiving chamber.

The above-indicated mutually oppositely directed combustion gas flows give rise in the corresponding receiving chamber to optimum turbulence in respect of such flows, which can deliberately cause the inert gas produced in the receiving chamber by pyrolytic decomposition to lose its possible aggressiveness. In addition, the mutually oppositely directed combustion gas flow configurations permit the corresponding receiving chamber to be quickly heated up, which saves time and thus advantageously contributes to optimising operation of the apparatus.

For the same purpose, in accordance with a preferred feature of that configuration, each receiving chamber may be provided for receiving a plurality of troughs or containers for contaminated material, which are arranged one above and behind the other, each trough or container being provided with a duct means or passage means for the specific flow of combustion gases therethrough. The duct or passage means is preferably disposed centrally on the trough or container to extend in the longitudinal direction at the bottom thereof. A suitable combustion gas flow can be passed through the duct or passage means of each trough or container in order to ensure that it is heated quickly.

The above-indicated configuration of the apparatus with the mutually oppositely directed combustion gas flow configurations in each receiving chamber advantageously also provides for a uniform constant pressure in that chamber, which is also advantageous in terms of optimising operation of the apparatus.

In still another aspect of the present invention the foregoing and other objects may be achieved by an apparatus for separating contaminated material such as metal from its impurities by heating, wherein baffle walls project into the combustion chamber of the apparatus at a spacing from the burner, while by-pass conduit means of the first and second receiving chambers open into the combustion chamber on the side of the baffle walls which is towards the first conduit means, in the vicinity of the baffle walls. By virtue of the presence of the baffle walls, it is possible for the burner to be operated at temperatures of the order of magnitude of between 1200° and 1500° C. without those high gas temperatures resulting in damage to the apparatus. By means of high temperatures of that order, it is advantageously possible for the gases which are produced by pyrolysis in the corresponding receiving chambers to undergo combustion in the combustion chamber, by virtue of the burner, health-endangering compounds such as dioxines, furanes and the like undergo combustion in the optimum fashion. The baffle walls cause the hot gases at a temperature of the order of between 1200° and 1500° C. to be changed in direction with the result that turbulence is generated in the gas flow. By virtue of the fact that the by-pass conduit means open into the combustion chamber in the vicinity of the baffle walls, more specifically on the front side thereof, remote from the burner, it is possible by means of the combustion gas flow passing through the by-pass conduit, for the hot gas from the receiving chambers to be cooled to temperatures of the order of magnitude of between 800° and 900° C. so that it is thereby possible reliably to exclude the above-mentioned damage to the combustion chamber or the burner device disposed between the receiving chambers. It is also possible for any combustible particles which are transported in the flow of gas through the corresponding bypass conduit to undergo post-combustion in the combustion chamber, in front of the baffle walls. That also makes it possible for the temperature in the respective receiving chamber which is in operation to be kept constant as desired, in other words, reliably to prevent overheating of the apparatus or the entire installation.

In accordance with a preferred embodiment of that configuration in accordance with the invention the first and second by-pass conduits are in fluid communication with a common collecting chamber which opens into the combustion chamber with spaced-apart nozzle openings.

In still a further aspect of the present invention the foregoing and other objects are achieved in an apparatus for separating contaminated material such as metal form impurities therein, by heating by means of hot combustion or exhaust gas produced by a burner, comprising a combustion chamber which has the burner and which is connected by first conduit means to respective ones of first and second receiving chambers which are spatially separated from the combustion chamber for receiving the contaminated material and which can be airtightly closed off relative to the ambient atmosphere, each being connected to the burner by way of a first return conduit means. Each receiving chamber has a heating chamber disposed therearound, the heating chamber being connected to a second conduit means which branches off the first conduit means, while respective control means are associated with the first and second conduit means. A respective second return conduit means extends between each heating chamber and its associated control means, and a respective by-pass conduit means extends between the respective control means and the common combustion chamber. The two first return conduit means open into the common burner, being separated from each other in respect of spatial configuration and flow, in such a way as to prevent an undesired flow of gas from one return conduit means to the other. That prevents an undesirable loss of the gas produced by pyrolysis in the receiving chamber, and said gas is available, without loss, for operation of the burner.

It is advantageous in that respect for each of the first return conduit means to be in fluid communication with an associated collecting chamber, the first and second collecting chambers being provided in a housing portion of the combustion chamber in spatially separated relationship from each other and opening with gas nozzles into the combustion chamber which is enlarged in a nozzle-like configuration towards the first conduit means.

The above-mentioned housing portion with said collecting chambers can if necessary be easily replaced if that should be found to be required. The nozzles of the two collecting chambers open into the combustion chamber in such a way that a flow of gas from one collecting chamber to the other is reliably prevented during operation of the burner, in particular due to the burner flow.

Further objects, features and advantages of the present invention will be apparent from the following description of a preferred embodiment.

BRIEF DESCRIPTION OF THE DRAWINGS

FIG. 7 is a view similar to that shown in FIG. 5 illustrating the receiving and heating chambers, showing the branch configuration by which the combustion gas distributor members at the door of the receiving chamber are supplied with gas, FIG. 8 is a view similar to that shown in FIG. 7, illustrating the supply of the combustion gas distributor members at the rear wall of the receiving chamber, FIG. 9 is a view from above of a trough provided for loading with contaminated metal, FIG. 10 is a view of the FIG. 9 trough viewing in the direction indicated by the arrow X in FIG. 9, FIG. 11 is a view of the trough-like configuration shown in FIG. 9, viewing in the direction indicated by the arrow XI.

DESCRIPTION OF THE PREFERRED EMBODIMENT

Figure 1:
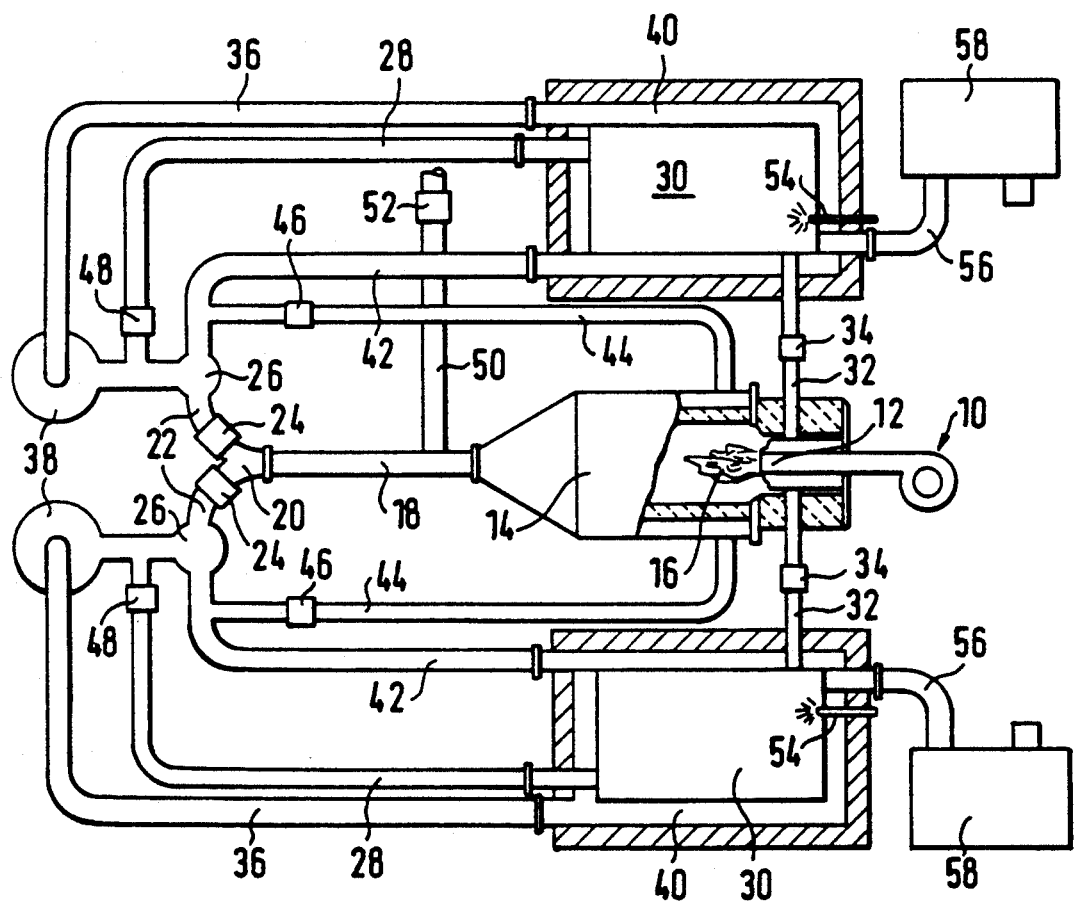
FIG. 1 is a diagrammatic overall view of the apparatus in accordance with the invention.

Referring firstly to FIG. 1, shown therein in diagrammatic form is an apparatus for separating material such as metal which contains impurities, from the impurities, comprising a burner 10 having a nozzle 12 which is directed into a combustion chamber generally indicated at 14. Reference numeral 16 in FIG.1 identifies a flame which in operation of the burner 10 is produced at or in front of the nozzle 12.

Reference numeral 18 in FIG. 1 identifies a first conduit which is connected to the combustion chamber 14 at one end and which at its other end has a branch connection 20. Extending from the branch connection 20 are two branch conduits 22 in which are disposed respective shut-off members 24. Each branch conduit 22 opens into a control device 26 which for example can be in the form of a multi-way throttle flap valve. Extending from each control device 26 is a further conduit 28 which, as an extension from the first conduit 18, opens into a respective corresponding air-tight receiving chamber 30 for receiving the contaminated metal or other material which is to be purified. Each receiving chamber 30 is in turn communicated with the burner 10 again by means of a first return conduit 32 in which a shut-off member 34 is disposed.

Beside the first conduit 28, branching from each control device 26 is a second conduit 36 in which a hot gas fan or blower 38 is disposed. At its end remote from the respective control device 26, each second conduit 36 communicates with a respective heating chamber 40 which is disposed around the respectively associated receiving chamber 30. A second return conduit 42 is provided between the corresponding control device 26 and the associated heating chamber 40. Reference numeral 44 identifies a by-pass conduit which extends between the respective control device 26 or associated second return conduit 42, and the combustion chamber 14, the by-pass conduit 44 including a shut-off member indicated at 46.

A shut-off member 48 is provided in each conduit 28 between the respective control device 26 and the associated receiving chamber 30.

Adjoining the combustion chamber 14 the first conduit 18 is provided with a chimney or flue 50 which has a closure device 52. The chimney or flue 50 may be connected to an exhaust gas scrubber (not shown).

Provided in each receiving chamber 30 is a respective sprinkler device 54. In addition a wet filter device 58 is connected to each receiving chamber 30 by means of a respective conduit 56.

Figure 2:
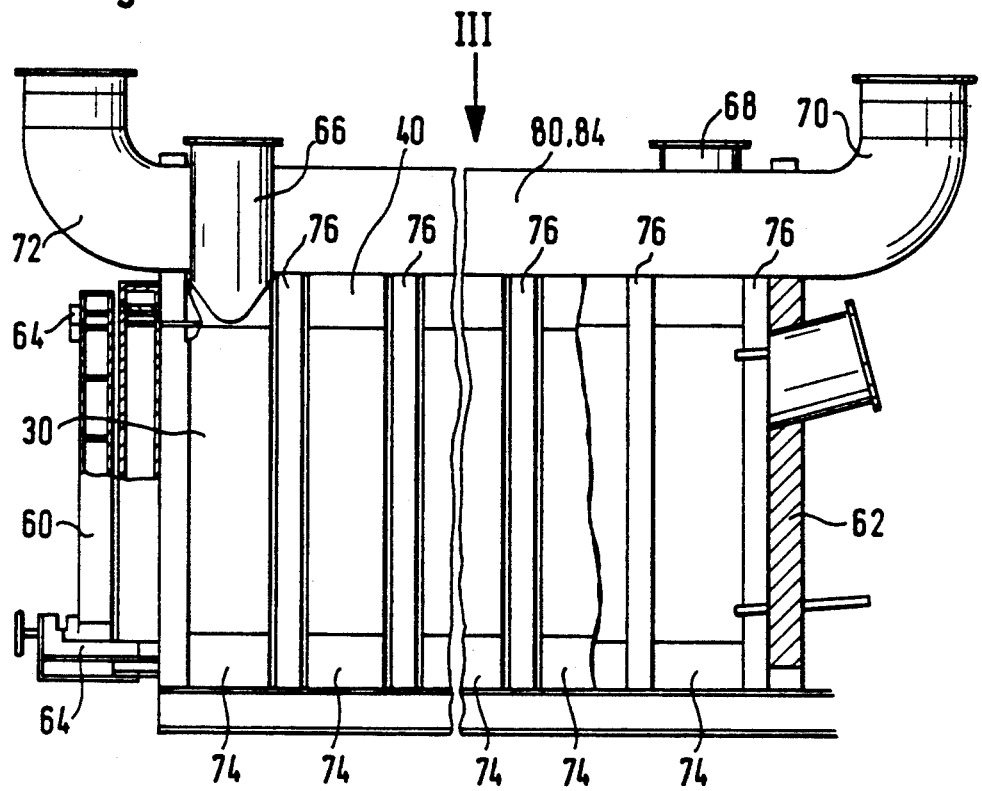
FIG. 2 is a partly sectional side view of a receiving chamber with a heating chamber therearound.
Figure 3:
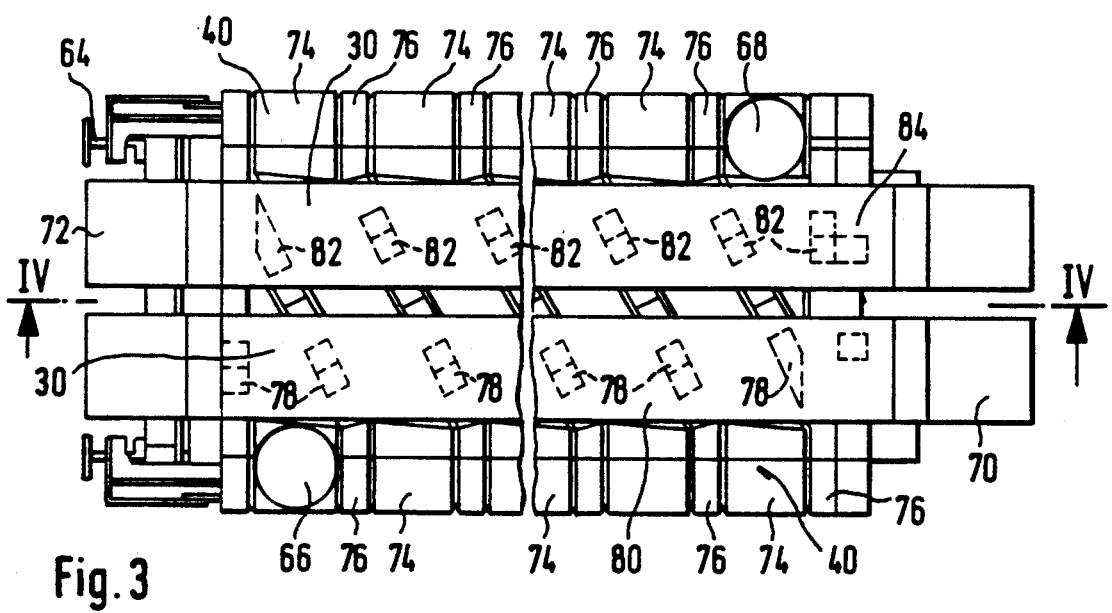
FIG. 3 is a view of the receiving and heating chambers in FIG. 2, viewing from above in the direction indicated by the arrow III in FIG. 2.

Reference will now be made to FIGS. 2 and 3 showing in greater detail one of the two receiving chambers 30, with the heating chamber 40 surrounding same, FIG. 2 being a side view of the arrangement and FIG. 3 being a plan view. At its front end the illustrated receiving chamber 30 can be air-tightly closed by a door 60 while at its rear the receiving chamber 30 is closed by a rear wall 62. Closure members 64 are provided on the door 60 for sealingly closing the receiving chamber 30 by means of the door.

The heating chamber 40 which surrounds the receiving chamber 30 is divided into first and second chamber means defining respective chamber spaces, of which one chamber means is designed for carrying the burner combustion or waste gas, having a combustion or waste gas inlet 66 and a combustion or waste gas outlet 68. The gas inlet 66 is designed for connection to the respective second conduit indicated at 36 in FIG. 1, while the outlet 68 is designed for connection to the second return conduit indicated at 42 in FIG. 1. The second chamber means of the heating chamber 40, which is spatially separated from the first chamber means which carries the burner gas, is provided with a coolant inlet 70 and a coolant outlet 72. The first chamber means for the burner combustion gas is formed with winding chamber portions 74 that are connected in a helical configuration to each other between the combustion gas inlet 66 and the combustion gas outlet 68. The second chamber means for the coolant is also formed with winding chamber portions 76 which are disposed between the winding chamber portions 74 for the combustion gas and which are also disposed in a helical configuration. While the winding chamber portions 74 for the combustion burner gas are connected together in series for a gas flow therethrough, each winding chamber portion 76 of the coolant chamber means which carries the flow of coolant is in fluid communication by way of its one end portion 78 to a first collecting conduit or manifold 80 which is provided with the coolant inlet 70. The second end portion 82 of each winding chamber portion 76 is communicated with a second collecting conduit or manifold 84 which is provided with the coolant outlet 72. The gas inlet 66 and the gas outlet 68, and the coolant inlet 70 and the coolant outlet 72, are disposed in such a way that, with the winding chamber portions 76 connected in parallel in respect of flow therethrough between the two collecting conduits or manifolds 80 and 84, and with the series-connected winding chamber portions 74, there is a counter-flow relationship between the flow of the burner gas through the winding chamber portions 74 and the flow of coolant in the heating chamber 40, the coolant flow flowing in parallel through the winding chamber portions 76. That counter-flow relationship permits rapid heat exchange between the overall flows of burner gas and coolant.

Figure 4:
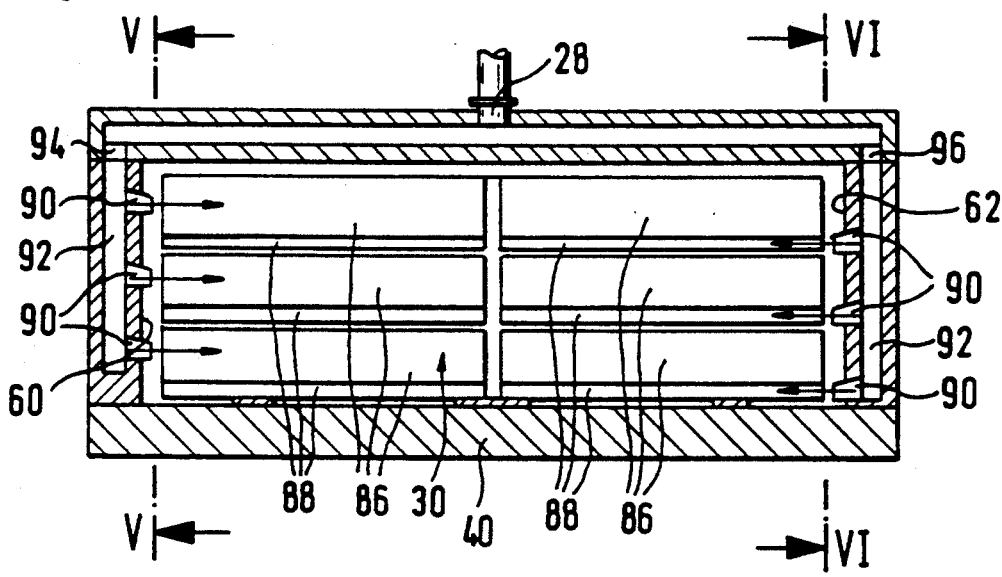
FIG. 4 is a diagrammatic view through the receiving and heating chambers in longitudinal section taken along section line IV—IV in FIG. 3.

Reference will now be made to FIG. 4 which is a diagrammatic view in longitudinal section of a receiving chamber 30 of the apparatus in accordance with the invention, with its door indicated at 60 and its rear wall indicated at 62. Containers or troughs 86 are arranged above each other and one behind the other in the receiving chamber 30 which is surrounded by a heating chamber as indicated at 40. The configuration of the troughs 86 will be apparent from FIGS. 9 through 11 and will be described in greater detail hereinafter. Each trough 86 has a central longitudinal duct or passage 88 extending therethrough.

Figure 5:
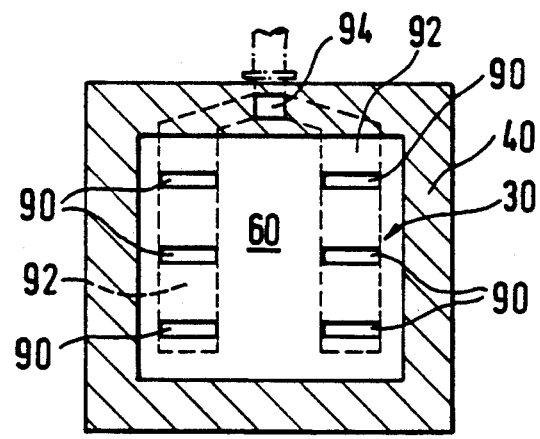
FIG. 5 is a view of the door of the receiving chamber in FIG. 4, viewing in the direction of the section line V—V in FIG. 4.

At its inward side the door 60 is provided with combustion or waste gas distributor members 90, FIG. 5 showing that provided at the inside of the door 60 are two rows of distributor members 90 which are arranged one above the other and at spacings from each other. Each of the two rows of distributor members 90 is in fluid communication with a space or chamber 92. The two spaces or chambers 92 in the door 60 can be communicated with the associated first conduit indicated at 28 in FIG. 1, by means of a branch connection arrangement 94 disposed in the region of the heating chamber 40. The rear wall 62 of the receiving chamber 30 is similarly provided with distributor members 90 which are in fluid communication with a collecting space or chamber 92. The last-mentioned gas distributor members 90 are disposed centrally on the rear wall 62 in such a way that they are directed towards the longitudinal ducts or passages 88 of the troughs 86. Accordingly in the interior of the receiving chamber 30 there is a counter-flow of the burner combustion gases due to the mutually oppositely directed gas distributor members 90, and accordingly the gases involve a good turbulence effect in the receiving chamber 30.

Figure 6:
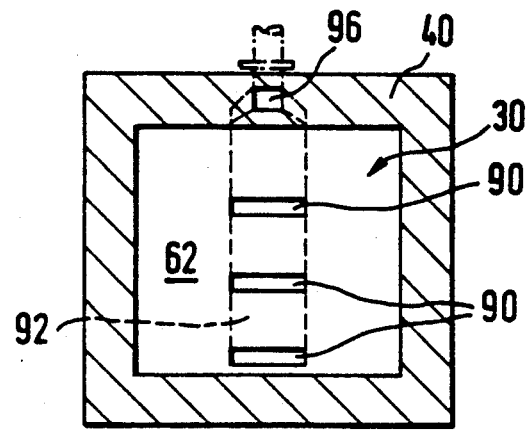
FIG. 6 is a view in section taken along section line VI—VI in FIG. 4 towards the rear of the diagrammatically illustrated receiving chamber.

The space or chamber 92 in the rear wall 62 can be communicated with the first conduit indicated at 28 in FIG. 1 by way of a conduit indicated at 96 in FIG. 6.

Referring now to FIG. 7, shown therein is the branch connection arrangement indicated at 94 in FIG. 5, with a portion of the first conduit 28, between the two collecting conduits or manifolds 80 and 84 which extend in parallel and side-by-side relationship. In FIG. 7, reference numeral 66 also indicates the combustion gas inlet into the heating chamber 40 which surrounds the receiving chamber 30, while reference numeral 68 indicates the combustion gas outlet. In a corresponding fashion, FIG. 8 shows the conduit 96 and the space or chamber 92 communicated therewith, as well as the portion of the first conduit 28 between the collecting conduits or manifolds 80 and 84, as well as the gas inlet 66 into the heating chamber 40 surrounding the receiving chamber 30, and the gas outlet from the heating chamber 40. It is thought that the configurations shown in FIGS. 7 and 8 will be clear from those Figures, having regard to the preceding description, and the structures shown in FIGS. 7 and 8 will therefore not be described in greater detail again at this point.

Reference will now be made to FIGS. 9, 10 and 11 showing a trough 86 for accommodating the material to be purified, comprising a bottom 98, side wall portions 100 extending therearound, and a central longitudinal duct or passage 88 provided at the bottom 98 thereof, which is provided for a given portion of the burner gas to be passed therethrough. The side wall portions 100 of each trough 86 are such that the portion of burner gas which flows through the gas distributor members 90 at the inside of the door 60 of the receiving chamber 30 can pass into the interior of the corresponding trough 86 in order to heat up as desired the contaminated metal disposed therein, and cause the impurities in the metal to experience pyrolytic decomposition.

Figure 12:
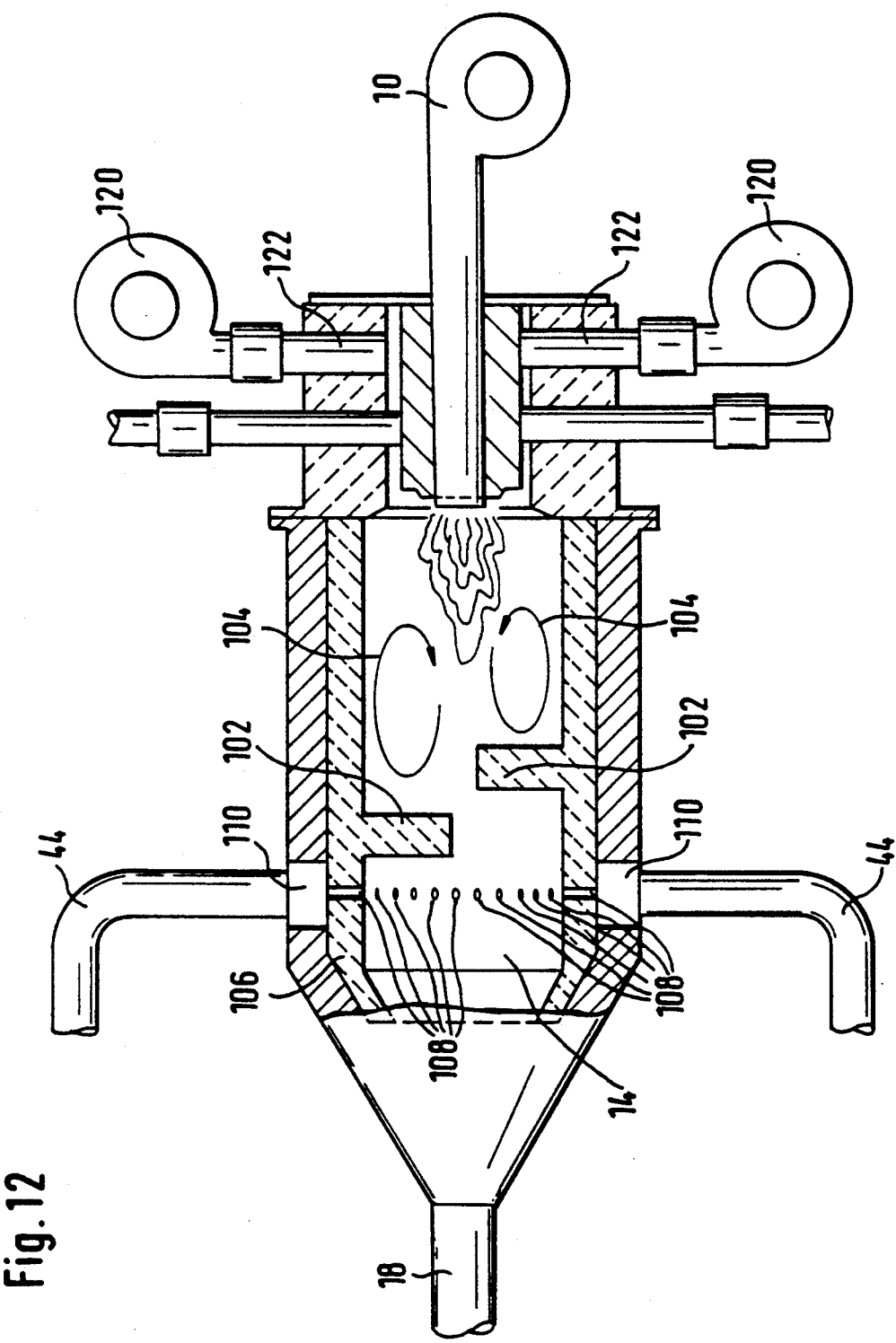
FIG. 12 is a diagrammatic view of the burner and combustion chamber, showing portions of first return conduits and portions of by-pass conduits.

FIG. 12 is a diagrammatic view of the burner 10 which projects into the combustion chamber 14. Reference numeral 102 in FIG. 12 identifies baffle or impingement walls which project into the interior of the combustion chamber 14 at a spacing from and in front of the burner 10. The baffle walls 102 cause a change in the direction of the hot burner combustion gases, as indicated by the arrows 104. Provided in the wall lining 106 of the combustion chamber, in front of the baffle walls 102, that is to say, downstream thereof, on the side which is towards the first conduit 18, are discharge openings 108 which are in fluid communication with an annular chamber 110 which extends around the combustion chamber at the outside of the lining 106 thereof and into which the by-pass conduits indicated at 44 in FIG. 1 and also shown in FIG. 12 open. That design configuration can provide not only for cooling of the hot burner gases but also post-combustion of combustible particles contained in the combustion gas.

Figure 13:
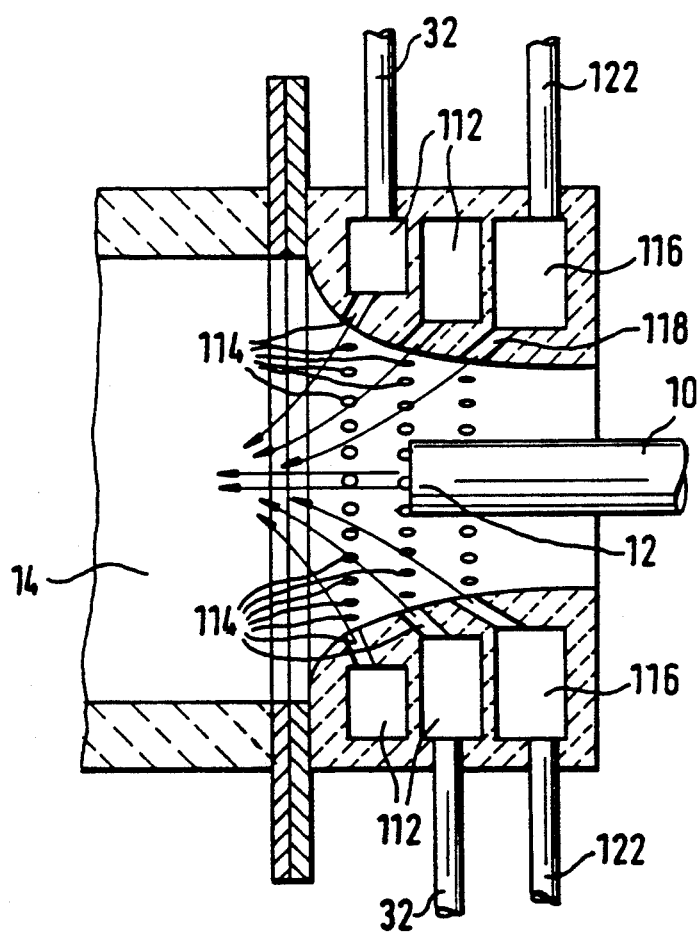
FIG. 13 is a view in longitudinal section of part of the burner and combustion chamber, with a housing portion provided with collecting chambers, and showing part of the burner.

FIG. 13 is a diagrammatic view of a configuration of the apparatus in accordance with the invention in which the first return conduits 32 do not open into the burner 10 in the manner diagrammatically indicated in FIG. 1, but separately from each other in respect of space and in respect of flow, in such a way that an unintentional waste gas flow from one return conduit 32 to the other return conduit 32 is reliably prevented, even when the shut-off member 34 is not operable to prevent a flow of gas through the respective conduit 32. For that purpose each first return conduit 32 is communicated with an associated collecting space or chamber 112, the chambers or spaces 112 being of an annular configuration and being spatially separated from each other. Each of the two spaces or chambers 112 opens into the combustion chamber 14 by way of gas nozzles 114. The nozzles 114 are so oriented that they are directed in front of the nozzle 12 of the burner 10 so that, in operation of the burner 10, the gases issuing through the nozzles 114 are entrained into the combustion chamber 14 with the combustion flame produced from the nozzle 12, or with the flow from the nozzle 12. Reference numeral 116 identifies an annular air space or chamber which opens into the combustion chamber 14, by way of nozzles 118. The chamber 116 is communicated with fans such as the fans indicated at 120 in FIG. 12, by way of conduits 122.

It will be appreciated that the foregoing structures have been set forth solely by way of example and illustration of the present invention and that various modifications and alterations may be made therein without thereby departing from the spirit and scope of the present invention.

What is claimed is:

1. In an apparatus for separating material containing impurities from the impurities by heating by means of hot gases produced by a burner, comprising a combustion chamber; a burner associated with the combustion chamber; first and second receiving chambers for receiving the contaminated material, which are spatially separated from the combustion chamber and which can be air-tightly closed off relative to the ambient atmosphere; first conduit means connecting the combustion chamber to the first and second receiving chambers; respective first return conduit means connecting the receiving chambers to the burner; a respective heating chamber surrounding each receiving chamber; second conduit means branching off said first conduit means and communicating with said heating chambers; respective control means associated with said first and second conduit means for controlling the flow therethrough of hot gas from the combustion chamber; respective second return conduit means between each heating chamber and the associated control means; and respective by-pass conduit means between the control means and the common combustion chamber, the improvement that each heating chamber is divided into first and second chamber means of which the first chamber means is adapted to carry the flow of burner gas, including a gas inlet in fluid communication with the associated second conduit means and a gas outlet in fluid communication with the associated second return conduit means, and the second chamber means is adapted to carry a flow of coolant, including a coolant inlet and a coolant outlet, each of the first and second chamber means of each heating chamber surrounding the respectively associated receiving chamber with winding chamber portions in a helical configuration and the winding chamber portions of the first and second chamber means being arranged in interleaving relationship in succession in the longitudinal direction of the respective heating chamber.

2. Apparatus as set forth in claim 1 wherein each receiving chamber includes an access door adapted to provide for air-tight closure of the chamber.

3. Apparatus as set forth in claim 1 wherein the winding chamber portions of said chamber means adapted to carry the flow of burner gas are connected in flow series to each other in a helical configuration, the chamber means of each heating chamber having mutually remote end portions providing said gas inlet and said gas outlet respectively.

4. Apparatus as set forth in claim 1 wherein each winding chamber portion of the coolant chamber means has first and second end portions and further including a first duct means in fluid communication with the first end portions of said winding chamber portions, and a second duct means in fluid communication with the second end portions of said winding chamber portions in such a way that the coolant winding chamber portions are connected in parallel flow relationship between the first and second duct means.

5. Apparatus as set forth in claim 4 wherein said gas inlet and said gas outlet and said coolant inlet and said coolant outlet are so provided that the winding chamber portions of the gas chamber means are adapted to carry the flow of burner gas in a helical configuration in the axial and the peripheral direction of the heating chamber in opposite relationship to the flow of the coolant in the winding chamber portions of the coolant chamber means.

6. In an apparatus for separating material containing impurities from the impurities by heating by means of hot gases produced by a burner, comprising a combustion chamber; a burner associated with the combustion chamber; first and second receiving chambers for receiving the contaminated material, which are spatially separated from the combustion chamber and which can be air-tightly closed off relative to the ambient atmosphere; first conduit means connecting the combustion chamber to the first and second receiving chambers; respective first return conduit means connecting the receiving chambers to the burner; a respective heating chamber surrounding each receiving chamber; second conduit means branching off said first conduit means and communicating with said heating chambers; respective control means associated with said first and second conduit means for controlling the flow therethrough of hot gas from the combustion chamber; respective second return conduit means between each heating chamber and the associated control means; and respective by-pass conduit means between the control means and the common combustion chamber, the improvement that each receiving chamber has a door for air-tight closure thereof and a rear wall remote from the door and has burner gas distributor means adapted to be in fluid communication with said first conduit means, said distributor means being disposed at the inside of the door and at the inside, which is towards the door, of the rear wall whereby oppositely directed gas flows occur in the receiving chamber.

7. Apparatus as set forth in claim 6 wherein each receiving chamber is adapted for receiving a plurality of troughs for contanimated material arranged above and one behind the other, each trough comprising a duct means for a controlled flow of gas therethrough.

8. In an apparatus for separating material containing impurities from the impurities by heating by means of hot gases produced by a burner, comprising a combustion chamber; a burner associated with the combustion chamber; first and second receiving chambers for receiving the contaminated material, which are spatially separated from the combustion chamber and which can be air-tightly closed off relative to the ambient atmosphere; first conduit means connecting the combustion chamber to the first and second receiving chambers; respective first return conduit means connecting the receiving chambers to the burner; a respective heating chamber surrounding each receiving chamber; second conduit means branching off said first conduit means and communicating with said heating chambers; respective control means associated with said first and second conduit means for controlling the flow therethrough of hot gas from the combustion chamber; respective second return conduit means between each heating chamber and the associated control means; and respective by-pass conduit means between the control means and the common combustion chamber, wherein baffle walls are disposed to project into the combustion chamber at a spacing from the burner and wherein the by-pass conduits of the receiving chambers open into the combustion chamber on the front side, which is towards the first conduit means, of the baffle walls in the vicinity thereof.

9. Apparatus as set forth in claim 8 including a common collecting chamber which is in fluid communication with the by-pass conduits, and spaced-apart nozzle openings communicating the combustion chamber with the collecting chamber.

10. In an apparatus for separating material containing impurities from the impurities by heating by means of hot gases produced by a burner, comprising a combustion chamber; a burner associated with the combustion chamber; first and second receiving chambers for receiving the contaminated material, which are spatially separated from the combustion chamber and which can be air-tightly closed off relative to the ambient atmosphere; first conduit means connecting the combustion chamber to the first and second receiving chambers; respective first return conduit means connecting the receiving chambers to the burner; a respective heating chamber surrounding each receiving chamber; second conduit means branching off said first conduit means and communicating with said heating chambers; respective control means associated with said first and second conduit means for controlling the flow therethrough of hot gas from the combustion chamber; respective second return conduit means between each heating chamber and the associated control means; and respective by-pass conduit means between the control means and the common combustion chamber, wherein the first return conduits open to the common burner separately from each other in respect of space and gas flow in such a way as to prevent an undesired gas flow from one return conduit to the other.

11. Apparatus as set forth in claim 10 including a respective collecting chamber with which each first return conduit means is in fluid communication, wherein the collecting chambers are provided in a housing portion of the combustion chamber in spatially separated relationship from each other, and further including gas nozzles opening into the combustion chamber.

12. Apparatus as set forth in claim 11 wherein said combustion chamber is of a nozzle-like enlarged configuration towards the first conduit means.

13. Apparatus for separating impurity-bearing material from the impurity by heating by means of hot gas, comprising: a combustion chamber; a burner operatively associated with the combustion chamber to produce hot gas; receiving chamber means for accommodating the material to be purified; first feed conduit means for passing hot gas from the combustion chamber to the receiving chamber means; first return conduit means providing a return communication from the receiving chamber means back to the burner; heating chamber means surrounding the receiving chamber means, the heating chamber means being divided into first and second chamber means of which the first includes a gas inlet in flow communication with the combustion chamber and an outlet and is adapted to carry the flow of burner gas from the combustion chamber from the inlet to the outlet, and the second includes a coolant inlet and a coolant outlet and is adapted to carry a flow of coolant, each of said first and second chamber means comprising chamber portions surrounding the receiving chamber means in a helical configuration in interleaved alternate relationship in succession in the longitudinal direction of the receiving chamber means; second feed conduit means for passing hot gas from the combustion chamber to the heating chamber means; and means for controlling the flow of hot gas through the first and second feed conduit means.

14. Apparatus as set forth in claim 13 wherein said combustion chamber includes baffle wall means therein to produce gas flow turbulence.

15. Apparatus as set forth in claim 13 wherein said receiving chamber means includes gas distributor means at opposite ends thereof and directed in mutually opposite relationship to feed hot gas into the receiving chamber means in opposite flow directions therein.

* * * * *